United States Patent Office 2,887,472

Patented May 19, 1959

2,887,472

PRODUCTION OF SOLID POLYETHYLENE BY A CATALYST CONSISTING ESSENTIALLY OF AN ALKALI METAL AND AN ADSORBENT ALUMINA-CONTAINING MATERIAL

Peter Fotis, Jr., Highland, Ind., assignor to Standard Oil Company, Chicago, Ill., a corporation of Indiana No Drawing. Application September 30, 1954 Serial No. 459,516

14 Claims. (Cl. 260—94.9)

This invention relates to a novel catalytic process for the conversion of ethylene to normally solid polymeric materials of relatively high molecular weight. More particularly, the present invention relates to a process for the conversion of ethylene by contact with an alkali metal and an adsorbent alumina-containing material to produce normally solid high molecular weight polymers.

One object of my invention is to provide novel and highly useful catalysts for the preparation of normally solid polymers from ethylene or ethylene-containing gas mixtures. Another object is to provide a relatively low temperature, low pressure process for the conversion of gas streams containing ethylene into substantial yields of normally solid polymers having molecular weights ranging upwardly from 300 or specific viscosities, as hereinafter defined, above about 1000. An additional object of my invention is to provide cheap catalytic combinations for effecting the purposes of the present invention.

Briefly, the inventive process comprises substantial conversion of ethylene to normally solid polymers ranging in consistency from grease-like to wax-like or tough, resinous materials, by contacting ethylene with an alkali metal and an adsorbent alumina-containing material (more fully specified hereinafter) at a conversion temperature between about 50° C. and about 200° C. at atmospheric or superatmospheric pressures for a period of time sufficient to effect the desired conversion, and recovery of the solid polymeric materials thus produced. Preferably, the catalyst is a pre-formed combination of an alkali metal with the adsorbent alumina-containing material, prepared, in general, by deposition of the alkali metal upon said adsorbent within a preferred temperature range to produce a dispersion of alkali metal upon said adsorbent in which the alkali metal has, preferably, colloidal dimensions or an area just exceeding the atomic area of the alkali metal.

Suitable adsorbent alumina-containing supports comprise the activated adsorptive aluminas of commerce, which are known to be members of the gamma-alumina family, including the so-called eta-alumina (note, for example, P. J. Nahin et al., Ind. Eng. Chem. 2021 (1949); H. C. Stumpf et al., Ind. Eng. Chem. 42, 1398–1403 (1950); M. K. B. Day et al., J. Phys. Chem. 57, 946–950 (December 1953); J. F. Brown et al., J. Chem. Soc., 1953, 84); argillaceous materials, particularly montmorillonitic clays and bauxite, for example, clays and clay-like materials which have heretofore been employed in the catalytic cracking of hydrocrabon oils to produce gasoline, such as the acid-treated clays (Filtrol, Superfiltrol, etc.); synthetic silica-alumina composites containing at least about 1% of alumina, for example, the calcined silica-alumina composites (which may also contain magnesia, thoria or zirconia) which have heretofore been employed in the catalytic cracking of hydrocarbon oils (note, for example, "Advances in Catalysis," vol. IV, pages 1+, especially pages 6 and 7, by R. C. Hansford, published by Academic Press, Inc., N.Y., 1952, and, in the same volume, a chapter by H. E. Ries, Jr., pages 87 and following, especially the tables at pages 93–4); and fluorided gamma-aluminas. Gamma-aluminas may be employed containing up to about 90 weight percent of oxides of metals such as titania and zirconia.

Desirable alumina-containing adsorbent materials have BET surface areas in the range of about 100 to about 700 square meters per gram, more often about 150 to 300 square meters per gram, and average pore radius of about 10 to 1000 A., usually of the order of about 25 A.

In effecting contacting of ethylene with the catalyst, it is highly desirable to supply to the reaction zone a liquid medium which serves both as a reaction medium and a solvent for the solid reaction products. Suitable liquid reaction media for polymerization include various hydrocarbons, such as liquid saturated hydrocarbons or an aromatic hydrocarbon such as benzene, toluene or xylenes. The conversion of ethylene can be effected in the absence of a liquid reaction medium and the catalyst containing accumulated solid polymeric conversion products can be treated from time to time, within or outside the conversion zone, to effect removal of conversion products therefrom and, if necessary, reactivation or regeneration of the catalyst for further use. The ethylene partial pressure in the reaction zone can be varied between about atmospheric pressure and 50,000 p.s.i.g. or even higher pressures, but is usually effected at pressures between about 200 and 10,000 p.s.i., for example, at about 1000 p.s.i.

The practice of the process of the present invention leads to polymers of widely variant molecular weight ranges and attendant physical and mechanical properties, dependent upon the selection of operating conditions. The inventive process is characterized by extreme flexibility both as regards operating conditions and as regards the products producible thereby. Thus the present process can be effected over extremely broad ranges of temperature and pressure. The practice of the present process can lead to grease-like polymers having an approximate molecular weight range of 300 to 700, wax-like polymers having an approximate specific viscosity ($\times 10^5$) between about 1000 and 10,000, and tough, resinous polymers having an approximate specific viscosity ($\times 10^5$) of 10,000 to more than 300,000 [($\eta$ relative $-1) \times 10^5$].

The conversion of ethylene to solid polymers can not be achieved by contact of the ethylene with an alkali metal such as sodium or potassium at relatively low temperatures within the range of about 50 to about 200° C. and at atmospheric or superatmospheric pressures; this is likewise true when adsorbent alumina-containing materials, alone, are contacted with ethylene. Surprisingly, I have discovered that a combination of alkali metal and adsorbent alumina-containing material is an effective catalyst for the substantial conversion of ethylene to normally solid polymers at low temperatures (50 to about 200° C.) and pressures ranging upward from atmospheric pressure.

As will be shown by example hereinafter, the alkali metal and adsorbent alumina-containing material can be added as discrete masses to the polymerization reaction zone, although it is preferred to pre-form the catalytic combination before use thereof in polymerization. It is believed that even when the components of the catalyst are added separately to the reaction zone, they combine therein to produce a catalyst which is a dispersion of the alkali metal upon the adsorbent alumina-containing material; it will be understood however that I am not bound by any theoretical explanations advanced herein.

The alkali metals consist of the series: lithium, sodium, potassium, rubidium and cesium, of which the first three are preferred for use in my invention because of their relative availability and cheapness. I can employ not only the individual alkali metals, but alloys or mixtures thereof with each other and/or with other metals such as calcium, barium, magnesium, aluminum and the like.

The proportion of alkali metal which may be employed ranges from about 1 to about 50% by weight, based on the weight of the adsorbent alumina-containing material, more often between about 5 and about 25% by weight. In its preferred form, the catalyst comprises a pre-formed colloidal dispersion of the alkali metal upon the adsorbent alumina-containing material. Sodium may readily be dispersed as colloidal particles of 0.5 to about 1000 millimicrons on activated alumina or other suitable adsorbents, at sodium concentrations up to about 20 to 25 weight percent, based on the weight of the adsorbent.

The dispersion of the alkali metal on the alumina-containing adsorbent can be effected by any known method and does not form part of the present invention. For example, the dispersion of alkali metal on the adsorbent may be effected by melting the alkali metal onto the heated adsorbent material, employed in the form of a powder, in the presence of a fluidizing stream of an inert gas such as helium, which serves to maintain the supporting adsorbent particles in the form of an agitated or fluidized bed. The alkali metal may be dispersed onto the adsorbent material in the absence of a fluidizing gas, while effecting agitation of the adsorbent particles by conventional mixing techniques. Another technique involves contacting a dispersion of alkali metal in a hydrocarbon medium with particles of the adsorbent material. Other methods for distributing alkali metals on solid supports may also be employed, e.g. by absorption of sodium from its ammonia solutions by alumina or the like.

I have made the surprising discovery that not all aluminas are suitable for use in the preparation of active catalysts for the purposes of my invention. Relatively low surface area alumina such as alpha or beta aluminas cannot be employed to prepare catalysts for the purpose of this invention. Another surprising discovery is that high surface area adsorbent solid materials such as activated charcoals, silica gel, titania and zirconia gels, are likewise not useful for the preparation of catalysts for the purpose of the present invention from alkali metals having an atomic number of at least 11.

The proportion of alkali metal, based on ethylene, should be at least 1 weight percent and may range, for example, from about 5 to about 25 weight percent.

The catalysts of this invention are partially or wholly deactivated by oxygen, moisture, carbon dioxide, nitrogen compounds and sulfur compounds. Consequently, contact of the catalyst or catalyst components with air, moisture or other noxious materials named should be minimized or avoided during the preparation of the catalyst and the use thereof in the conversion of the ethylene charging stock to solid materials. Before use in catalyst preparation, it is desirable to thoroughly dry and possibly to evacuate the adsorbent alumina-containing materials. The catalyst composite may be diluted with inert solid materials which have no deleterious effect upon the polymerization reaction in order to modify catalyst activity, if desired. The catalyst can be employed in various forms and sizes, e.g., as powder, granules, microspheres, broken filter cake, lumps, or shaped pellets. A convenient form in which the catalysts may be employed is as granules of about 20–200 mesh/inch size range.

Although the polymerization temperature range encompasses temperatures between about 50° C. and about 200° C. or 225° C., ordinarily it is preferred to employ the range of about 125° C. to about 175° C. in order to maximize the yield of solid or high molecular weight polymer.

Ethylene partial pressures may be varied within the range of about 15 p.s.i. to the maximum pressure which can economically be employed in suitable commercial equipment, for example up to as much as 50,000 p.s.i. A convenient ethylene partial pressure range for the manufacture of solid polymers by the use of the present catalysts is about 200 to about 10,000 p.s.i., which constitutes a distinct advantage over the commercial high pressure ethylene polymerization processes which apparently require operating pressures in the range of about 20,000 to about 50,000 p.s.i.

The ethylene may contain inert hydrocarbons, as in refinery gas streams, for example, methane, ethane, propane, etc. However, it is preferred to employ as pure and concentrated ethylene charging stocks as it is possible to obtain. It is desirable to minimize or avoid the introduction of oxygen, carbon dioxide, acetylene, water or sulfur compounds into contact with the catalyst.

The ethylene can be polymerized in the gas phase and in the absence of a liquid reaction medium by contact with the catalyst. Upon completion of the desired polymerization reaction it is then possible to treat the catalyst for recovery of the solid polymerization products, for example by extraction with suitable solvents.

The contact time or space velocity employed in the polymerization process will be selected with reference to the other variables, catalysts, the specific type of product desired and the extent of olefin conversion desired in any given run or pass over the catalyst. In general, this variable is readily adjustable to obtain the desired results. In operations in which the ethylene charging stock is caused to flow continuously into and out of contact with the solid catalyst, suitable liquid hourly space velocities are usually selected between about 0.1 and about 10 volumes, preferably about 0.5 to 5 or about 2 volumes of ethylene solution in a liquid reaction medium, which may be a paraffinic hydrocarbon such as n-pentane, an aromatic hydrocarbon such as benzene or xylenes; tetralin or other cycloaliphatic hydrocarbon, such as cyclohexane or decalin (decahydronaphthalene).

The amount of ethylene in such solution may be in the range of about 2 to 50% by weight, preferably about 2 to about 10 weight percent or, for example, about 5 to 10 weight percent. When the ethylene concentration in the liquid reaction medium is decreased below about 2 weight percent, the molecular weight and melt viscosity of the polymeric products tend to drop sharply. In general, the rate of ethylene polymerization tends to increase with increasing concentration of the ethylene in the liquid reaction medium. However, the rate of ethylene polymerization to form high molecular weight, normally solid polymers is preferably not such as to yield said solid polymers in quantities which substantially exceed the solubility thereof in said liquid reaction medium under the reaction conditions, usually up to about 5–7 weight percent, exclusive of the amounts of polymeric products which are selectively adsorbed by the catalyst. Although ethylene concentrations above 10 weight percent in the liquid reaction medium may be used, solutions of ethylene polymer above 5–10% in the reaction medium become very viscous and difficult to handle and severe cracking or spalling of the catalyst particles or fragments may occur, resulting in catalyst carry-over as fines with the solution of polymerization products and extensive loss of catalyst from the reactor.

In batch operations, operating periods between one-half and about 20 hours, usually between about 1 and about 4 hours, are employed and the reaction autoclave is charged with ethylene as the pressure falls as a result of the olefin conversion reaction.

Various classes of hydrocarbons or their mixtures which are liquid under the polymerization conditions of the present process can be employed. Certain classes of aliphatic hydrocarbons can be employed as a liquid hydrocarbon reaction medium in the present process. Thus, I can employ various saturated hydrocarbons (alkanes and cycloalkanes) which are liquid under the polymerization reaction conditions and which do not crack substantially under the reaction conditions. Either pure alkanes or cycloalkanes or commercially available mixtures, freed of catalyst poisons, can be employed. For example, I can employ straight run naphthas or kerosenes containing alkanes and cycloalkanes. Specifically I can employ liquid or liquefied alkanes such as n-pentane, n-hexane, 2,3-dimethylbutane, n-octane, iso-octane (2,2,4-trimethylpentane), n-decane, n-dodecane, cyclohexane, methylcyclohexane, dimethylcyclopentane, ethylcyclohexane, decalin, methyldecalins, dimethyldecalins and the like.

I can also employ a liquid hydrocarbon reaction medium comprising liquid olefins, e.g., n-hexenes, cyclohexene, octenes, hexadecenes and the like, although I prefer to use saturated or aromatic hydrocarbons.

The normally solid polymerization products which are retained on the catalyst surface or grease-like ethylene polymers may themselves function to some extent as a liquefied hydrocarbon reaction medium, but it is highly desirable to add a viscosity-reducing hydrocarbon, such as those mentioned above, thereto in the reaction zone.

Members of the aromatic hydrocarbon series, particularly the mononuclear aromatic hydrocarbons, viz., benzene, toluene, xylenes, mesitylene and xylene-p-cymene mixtures can be employed. Tetrahydronaphthalene can also be employed. In addition, I can employ such aromatic hydrocarbons as ethylbenzene, isopropylbenzene, sec-butylbenzene, t-butylbenzene, ethyltoluene, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

I can also employ certain alkylnaphthalenes which are liquid under the polymerization reaction conditions, for example, 1-methylnaphthalene, 2-isopropylnaphthalene, 1-n-amylnaphthalene and the like, or commercially produced fractions containing these hydrocarbons.

The liquid hydrocarbon reaction medium should be freed of poisons before use in the present invention by acid treatment, e.g., with anhydrous p-toluenesulfonic acid, sulfuric acid, or by equivalent treatments, for example with aluminum halides, or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

C.P. xylenes can be purified by refluxing with a mixture of 8 weight percent $MoO_3$ on $Al_2O_3$ catalyst and $LiAlH_4$ (50 cc. xylene–1 g. catalyst–0.2 g. $LiAlH_4$) at atmospheric pressure, followed by distillation of the xylenes. Still more effective purification of solvent can be achieved by heating it to about 225–250° C. with either sodium and hydrogen or NaH plus 8 weight percent $MoO_3$—$Al_2O_3$ catalyst in a pressure vessel.

Temperature control during the course of the ethylene conversion process can be readily accomplished owing to the presence in the reaction zone of a large liquid mass having relatively high heat capacity. The liquid hydrocarbon reaction medium can be cooled by heat exchange inside or outside the reaction zone.

When alkylatable aromatic hydrocarbon solvents are employed, alkylation thereof by ethylene may occur under the reaction conditions. Such alkylate as is produced is removed with grease in the present process, can be separated therefrom by fractional distillation and can, if desired, be returned to the polymerization zone. The alkylation problem can be avoided by effecting polymerization in the absence of solvents or in the presence of non-alkylatable solvents such as saturated liquid hydrocarbons, particularly n-paraffins such as n-pentane. When benzene is employed as solvent, it is found that under some conditions ethylene can be polymerized to yield a normally solid polymer without substantial (less than 10 volume percent) alkylation of the benzene. The polymerization is not dependent on the occurrence of alkylation, which seems merely to be a co-reaction of the olefinic feed stock under some circumstances.

The following specific examples and data are introduced in order to illustrate but not unduly to limit my invention. The exemplary operations were effected in 250 cc. capacity stainless steel pressure vessels provided with a magnetically actuated stirrup-type stirrer which was reciprocated through the reaction zone (Magne-Dash reactors). In the exemplified operations, contacting of the reactants and catalyst was effected under the specified conditions. At the end of the reaction period the reactor was allowed to cool to room temperature and bled down to atmospheric pressure. The reactor was then opened, liquid products were removed for distillation and the catalyst was washed with methanol to remove alkali metal and then with hot xylenes to extract occluded solid polymer. High molecular weight wax-like and resinous polyethylenes precipitated from the xylenes solution upon methanol addition at room temperature and the filtrate was evaporated to produce a residue of grease-like polymers. Specific viscosities (Staudinger) which are reported hereinafter are defined as relative viscosity minus one and relative viscosity is the ratio of the time of efflux of a solution of 0.125 g. polymer in 100 cc. C.P. xylenes at 110° C. from the viscosimeter as compared with the time of efflux of 100 cc. C.P. xylenes at 110° C. Melt viscosities were determined by the method of Dienes and Klemm, J. Appl. Phys. 17, 458–71 (1946).

In obtaining the data set forth in Table 1, pre-formed catalyst of 20 weight percent of sodium, based on the weight of the supporting material (total of 12 grams), was employed. In each instance, except in Examples 6, 7, 9 and 11, the catalyst was prepared by fluidizing particles of the powdered support in a helium stream at 250 to 260° C. and melting the sodium onto the supporting material. In Examples 6, 7, 9 and 11, mechanical stirring of the support in a helium atmosphere was used. The batch reactions were effected with an initial ethylene pressure of 1000 p.s.i. in the presence of 100 ml. of benzene. The benzene was purified by contacting with $LiAlH_4$.

TABLE 1
*Polymerization of ethylene in the presence of supported sodium catalysts*

| Example No. | Support | Temp., °C. | Time, hrs. | ΔP, p.s.i. | Solid polymer, g. | Remarks |
|---|---|---|---|---|---|---|
| 1 | Al₂O₃ | 141 | 19 | 0 | 0 (trace) | Very low surface (Alcoa Tabular Alumina). |
| 2 | NaCl | 141 | 19 | 0 | 0 | |
| 3 | NaCl | 230 | 19 | 0 | 0 | |
| 4 | Charcoal | 141 | 19 | 940 | 0 | Pressure drop due to alkylation of benzene. |
| 5 | TiO₂ | 141 | 19 | 35 | 0 | 93% TiO₂ (from TAM Corp.). |
| 6 | TiO₂ | 141 | 19 | 50 | 0.3 | C.P. TiO₂ (Baker Co.). |
| 7 | SiO₂ gel | 141 | 19 | 10 | 0.1 | |
| 8 | Act. Al₂O₃ | 141 | 19 | 180 | 4.5 | |
| 9 | Act. Al₂O₃ | 141 | 10 | 2,410 | 6.7 | |
| 10 | SiO₂—Al₂O₃ | 141 | 19 | 500+ | 4.3 | $n_{sp}$=9,400. $d_{24}$=0.9720. Williams plasticity=18.4. $n_m$=1.2×10⁴. |
| 11 | Act. Al₂O₃ | 140 | 6.5 | 1,765 | 8.1 | Indiana alumina gel. |

It will be noted from Example 1 that a low surface area (less than 4 sq. m./g.), tabular alumina (an alpha-alumina) could not be employed to prepare an effective catalyst for the polymerization of ethylene to normally solid materials. The inoperability of sodium chloride powder for the preparation of useful catalysts for this invention was also demonstrated in Examples 2 and 3, despite the fact that it is known that sodium can be dispersed on powdered sodium chloride in a form of very high surface area. An activated coconut charcoal (Burrell) having a surface area of about 1100 square meters per gram, a pore volume of about 0.59 cc. per gram and a pore diameter of about 21 A. units was employed as a support for sodium in Example 4. Despite these very favorable indications as an adsorbent, it will be noted from Example 4 that the charcoal could not be employed for the preparation of a satisfactory catalyst. Examples 5, 6 and 7 likewise demonstrate the inutility of titania and silica supports.

Examples 8 and 9 illustrate the efficacy of an activated adsorptive alumina (gamma-alumina) in the preparation of catalysts for the purposes of the present invention. The utility of a silica-alumina catalyst is demonstrated in Example 10. The silica-alumina catalyst of Example 10 was a commercial product (sold by National Aluminate Company) containing 99 weight percent alumina and 1 weight percent silica.

The alumina component of Example 11 was the so-called "Indiana" alumina gel prepared in accordance with the patents of Standard Oil Co. (Indiana), for example, U.S. Patent 2,274,634 (Reissue 22,196). Briefly, the alumina gel is prepared by reaction of metallic aluminum with aqueous mercuric nitrate to form an amalgam of aluminum which is peptized to form an alumina sol by the use of formic or acetic acid; the sol is gelled by the addition of aqueous ammonia and is dried and calcined for use. It will be noted that the alumina gel thus prepared was very suitable for the preparation of a catalyst for the purpose of my invention.

TABLE 2
*Polymerization of ethylene with various alkali metal-Al₂O₃ catalysts*

[Cat. Composition: 10 g. of act. Al₂O₃ and 2 g. of metal.]

Max. Press. ---------------------------------- 1000 p.s.i.
Temp. -------------------------------------- 141° C.
Solvent ------------------------------------ Benzene, 100 ml.

| Example No. | Metal | Time, hrs. | ΔP, p.s.i. | Solid polymer, g. | Props. of Solid polymer |
|---|---|---|---|---|---|
| 12 | Na | 10 | 2,410 | 6.7 | |
| 13 | K | 20 | 470 | 1.8 | $n_{sp}$=4,500. $d_{24}$=0.9413 |
| 14 | Li | 19 | 25 | 1.2 | $n_{sp}$=6,000 |

TABLE 3
*Solvent and temperature effects on polymerization of ethylene with Na/Al₂O₃ catalysts*

| Example No. | Reaction Medium (100 ml.) | Temp., °C. | ΔP, p.s.i. | Solid polymer, g. | Props. of Solid polymer |
|---|---|---|---|---|---|
| 15 | none | 141 | 225 | 1.2 | $n_{sp}$=6,300. $d_{24}$=.9828. |
| 16 | Pentane | 141 | 175 | 0.5 | $n_{sp}$=5,800. |
| 17 | Benzene | 75 | 25 | 0.25 | $n_{sp}$=22,300. |
| 18 | do | 141 | 180 | 4.5 | $n_{sp}$=8,300. $d_{24}$=0.9725. |
| 19 | do | 250 | 110 | trace | |
| 20 | do | 141 | 3,400 | 1.7 | Pressure 7,400 p.s.i. Time 3 hrs. $n_{sp}$=26,300. $d_{24}$=0.9690. $n_m$=2.8×10⁶. |

It is apparent from the data set forth in Table 2 that the three most common alkali metals are effective components of catalysts for the purposes of my invention. Some alkylation of the benzene reaction medium occurred incidental to polymerization in Examples 12 and 13. However, no alkylation of the benzene occurred when the lithium-alumina catalyst was used. The lithium-alumina catalyst was prepared by fluidizing powdered alumina (chromatographic adsorption grade, produced by Fisher Scientific Co.) with helium at 260 to 280° C. and coating the fluidized particles with molten lithium.

In Table 3 are presented data indicating various solvent and temperature effects on the polymerization of ethylene in the presence of sodium dispersed on activated alumina. The catalyst was prepared by coating 2 grams of molten sodium on 10 grams of activated powdered alumina (Fisher Scientific Co. chromatographic adsorption grade) at 250 to 260° C. The sodium was colloidally dispersed in the alumina. Reaction was effected with an initial ethylene pressure of 1000 p.s.i. and all Examples except 20 were conducted for 19 hours. It will be noted from the data of Example 15 that substantial polymerization of ethylene to form a solid polymer occurred readily in the absence of a liquid hydrocarbon reaction medium. In this operation there is, of course, no co-reaction of ethylene with an alkylatable solvent to produce alkylation products. In Example 16 n-pentane was successfully employed as the liquid reaction medium and no noticeable alkylation thereof was found to occur. The liquid reaction medium in Examples 17 to 20, inclusive, was benzene. A comparison of Example 18 with 17 indicates an increased rate of reaction and solid polymer production by increasing the reaction temperature from 75° C. to 141° C. Example 19 shows that the reaction temperature of 250° C. was somewhat too high, at least for operations at the stated pressure, since only a trace of solid polymer was obtained. In Example 20 the initial ethylene pressure was 7400 p.s.i. and the reaction period was reduced to 3 hours; even with this relatively short reaction period, a substantial conversion of ethylene to a solid polymer was obtained.

TABLE 4

| Example | Wt. Percent Na in Catalyst | Ethylene Conversion Rate, Δ P/Min. | Reaction Time, hrs. | Solid Polymers, g. |
|---|---|---|---|---|
| 21 | 0 | 0.0 | 19 | 0.0 |
| 22 | 5 | 2.2 | 6.5 | 7.0 |
| 23 | 7.5 | 8.1 | 6.5 | 14.2 |
| 24 | 17 | 3.8 | 6.5 | 10.7 |

Table 4 provides some indications of the effects of the sodium concentration in sodium-alumina catalysts in the polymerization of ethylene to form normally solid polymers. To prepare Na—$Al_2O_3$ catalysts, fluidized commercial activated alumina (Fisher Scientific Co. chromatographic adsorption grade) powder (10 g.) was coated with the indicated percentage by weight, based on the weight of alumina and sodium, of molten sodium at 250 to 260° C. The polymerizations were conducted with an initial ethylene pressure of 1000 p.s.i. at 140° C. in the presence of 100 ml. of benzene as the liquid hydrocarbon reaction medium. It will be noted from Example 21 that the use of activated adsorbent alumina in the absence of alkali metal failed to yield a solid ethylene polymer, whereas catalysts containing 5, 7.5 and 17 weight percent of sodium were active for the purposes of the present invention. A catalyst containing 50 weight percent sodium, based on alumina, was also prepared and was active under the above-mentioned conditions for the conversion of ethylene to solid polymer. However, partial decomposition of the catalyst occurred during its transfer from the preparation vessel to the reaction vessel so that the data can not be set forth with precision.

TABLE 5

| Example No. | Alkali Metal, 2 g. | Support, 10 g. | Temp., ° C. | ΔP, p.s.i. | Time, hrs. | Solid Polymer, g. | Remarks |
|---|---|---|---|---|---|---|---|
| 25 | Na | Act. $Al_2O_3$ | 141 | 390 | 19 | 2.5 | $n_{sp}$=8,800. |
| 26 | Na | Act. $Al_2O_3$ | 141 | 55 | 19 | 0.1 | Indiana gel. |
| 27 | Na | $SiO_2$-$Al_2O_3$* | 141 | 25 | 19 | 0.1 | *1% $SiO_2$; Na—<0.1%. $Al_2O_3$—>88%. (Nalcat.). |
| 28 | Na | $TiO_2$ gel | 141 | 20 | 19 | trace | |
| 29 | Na | $ZrO_2$ gel | 141 | 10 | 19 | trace | |
| 30 | [Na dispersion in toluene]. | Act. $Al_2O_3$ | 141 | 50 | 16 | 0.2 | The Na dispersion was 20% in $\phi CH_3$; used 10 g. of the dispersion which contained 2 g. of Na. |
| 31 | K | Act. $Al_2O_3$ | 141 | 800 | 19 | 0.25 | |
| 32 | Li | Act. $Al_2O_3$ | 205 | 95 | 44 | 0.5 | Waxy product, M.P. 107° C. $n_{sp}$=3,100. |

In Table 5 are presented data obtained in the polymerization of ethylene employing catalysts which were not pre-formed outside the reactor before use. In each instance the adsorbent supporting material and the alkali metal were added separately to the reactor containing 100 ml. of highly purified benzene. It will be noted from Example 25 that this technique was successfully employed for the preparation of solid polyethylenes. The polymer which was extracted from the catalyst melted in the range of 124 to 127° C. In Example 26 the alumina was an Indiana gel prepared from an alumina amalgam. A comparison of this example with Example 11 (Table 1), in which a much shorter reaction period was used, shows that the catalyst prepared by pre-coating the sodium on the alumina was much more active for the conversion of ethylene to solid polymer, the yield being 8.1 g. compared to the 0.1 g. obtained in Example 26. The same observation may be made with respect to Example 27, which should be compared with Example 10 of Table 1. Examples 28 and 29 indicate that the separate introduction of sodium and titania gel or zirconia gel into the reactor yielded no more than a trace of solid polymers. Example 30 indicates the successful employment of a colloidal sodium dispersion in toluene in combination with a commercial activated alumina. Examples 31 and 32 indicate the successful co-employment of potassium and lithium, respectively, with commercial activated alumina, separately added to the reactor.

TABLE 6

*Effect of temperature of cat. preparation on activity*

| Ex. No. | Cat. Prep. Temp., ° C. | Pressure drop, p.s.i./min. | Solid Polymer, g. | Polymer Props. |
|---|---|---|---|---|
| 33 | 150 | 1.04 | 2.8 | $d_{24°}$=0.9702 $10^5 \times n_{sp}$=27,800 $n_m$=1.3×10[6] |
| 34 | 250 | 4.6 | 8.1 | $d_{24°}$=0.9696 $10^5 \times n_{sp}$=9,300 $n_m$=1.8×10[4] |
| 35 | 400 | 3.85 | 10.7 | $d_{24}$=0.9699 $10^5 \times n_{sp}$=7,400 $n_m$=10[4] |
| 36 | 400 | 2.5 | 5.3 | |
| 37 | 400 | 8.2 | 14.2 | |
| 38 | 400 | 6.6 | 14.3 | |

In Table 6 are presented data illustrating some of the effects of the temperature at which sodium was deposited upon alumina on the polymerization characteristics of the resultant catalysts. In Examples 33, 34 and 35, 10 grams of commercial activated alumina were mechanically mixed at the indicated temperature with 2 grams of molten sodium under a helium blanket. The resultant catalyst was then transferred to a 250 ml. Magne-Dash reactor, 100 ml. of highly purified benzene was added and the polymerization of ethylene was effected at 140° C. for 6.5 hours with an initial ethylene pressure of 1000 p.s.i. From the data of Table 6 it will be noted that increases in the temperature of catalyst preparation had a remarkable effect in increasing the yield of solid polyethylenes. In Examples 36, 37 and 38, the proportions of sodium were, respectively, 5, 8 and 10 weight percent, based on the weight of the alumina, compared with 20 weight percent in Example 35.

One particularly noteworthy fact which is evident from the examples supplied above is the extremely high density of the polyethylene obtained by ethylene polymerization in the presence of the catalysts comprising sodium. It will be noted from the data that the density of the polymers obtained by the use of sodium catalysts ranged from about 0.97 to about 0.98, measured at 24° C. The high density polymers are characterized also by high crystallinity and by the superior resistance of films of such materials, supported or unsupported, to the transmission of vapors, particularly water vapor. The high density and high crystallinity characteristics of the sodium-derived polymers lend interest to these materials for coating paper, fabrics, etc., for use as wrappers, vapor barriers and the like, e.g. in packaging foodstuffs.

Three comparative examples were carried out for the preparation of polyethylene using both fluorinated alumina supports and (non-fluorinated) gamma-alumina.

It was found that the fluorinated catalyst gave a lower yield of a higher specific viscosity polymer than that of the non-fluorinated catalyst used as a control.

The fluorination was carried out by contact of the catalyst support with anhydrous HF with stirring. The catalyst for Example 40 was fluorinated in a copper funnel with a screen bottom and a polyethylene cover. Fourteen grams of 8 to 10 mesh gamma-alumina (Indiana sol) was charged to the copper apparatus. Anhydrous HF was passed through the support slowly for one hour with intermittent stirring. The catalyst gained 6.5 g. Most of the water condensed on the polyethylene cover. Some water may have been lost, however, since the temperature due to reaction was estimated to be above 120° C. The fluorinated catalyst was dried in a vacuum oven overnight at 105° C. It was calcined for 18 hours at 480° C. The calcined catalyst weighed 16.15 g.

The catalyst support for Example 41 was fluorinated in a polyethylene bottle with shaking at a temperature below 115° C. using anhydrous HF. The polyethylene bottle was capped and shaken and periodically weighed. Fourteen g. of 8 to 10 mesh gamma-alumina was charged to the polyethylene apparatus. The support was fluorinated until a 2.4 g. weight gain was recorded over about a 20-minute period. The catalyst was transferred to a porcelain casserole for drying and calcining. The catalyst weighed 16.15 g. There was some loss of catalyst due to transfer. The catalyst was dried under vacuum at 105° C. and calcined overnight at 510° C. The catalyst after calcining weighed 14.1 g.

In each of the examples, 2.0 g. of sodium were dispersed on 10.0 g. of support by mechanically stirring the powdered support with molten sodium at about 255° C. in a helium atmosphere.

The catalyst was transferred to the reactor, a 250 cc. stainless steel Magne-Dash, under 100 cc. of benzene solvent in an atmosphere of helium and dry nitrogen. Mallinckrodt, thiophene-free benzene, analytical reagent, was used as the solvent, and it had been dried over $CaH_2$ and filtered. The reactor was sealed and purged briefly with dry nitrogen. The bomb was then heated to 141° C. and ethylene was charged to the bomb over a five-hour period. The maximum ethylene pressure was 970 p.s.i.g. After reaction the bomb was cooled and opened. The solvent was filtered off and the solid polyethylene and catalyst mixture was quenched with methanol to destroy the sodium. The product-catalyst mixture was allowed to dry and was then extracted with boiling xylene to remove the polymer. The xylene extractor contained a water trap in the reflux stream to remove water from the xylene. To the cold xylene solution was added about 50 volume percent methanol and the precipitated polymer was filtered and dried in a vacuum oven.

The data are presented in Table 7.

TABLE 7

| Example No. | Wt. Percent F in $Al_2O_3$ | Solid Polymer, g. | Grease, g. | Physical Props. of Solid Polymers | |
|---|---|---|---|---|---|
| | | | | $n_{sp}\times10^5$ | $d_{24}/4°$ C. |
| 39 | 0 | 3.0 | 3.8 | 8,400 | 0.9889 |
| 40 | 20 | 0.75 | 1.6 | 72,200 | 0.9758 |
| 41 | 4.9 | 1.2 | 1.9 | 63,300 | 0.9662 |

The benzene filtrates taken from the reactor after the runs represented about 60 to 70 volume percent of the benzene charged. Distillation showed that the main alkylation product was sec.-butylbenzene with possibly a small amount of ethylbenzene. The sec.-butylbenzene fractions represented about 5 to 10 weight percent of the filtrate. There appeared to be a little less alkylation using the fluorinated alumina than that obtained with the non-fluorinated catalyst.

The polymers produced by the process of this invention can be subjected to such after-treatment as may be desired, to fit them for particular uses or to impart desired properties. Thus, the polymers can be extruded, mechanically milled, filmed or cast, or converted to sponges or lattices. Antioxidants, stabilizers, fillers, extenders, plasticizers, pigments, insecticides, fungicides, etc. can be incorporated in the polyethylenes and/or in by-product alkylates or "greases." The polyethylenes may be employed as coating materials, binders, etc.

The polymers produced by the process of the present invention, especially the polymers having high specific viscosities, can be blended with the lower molecular weight polyethylenes to impart stiffness or flexibility or other desired properties thereto. The solid resinous products produced by the process of the present invention can, likewise, be blended in any desired proportions with hydrocarbon oils, waxes such as paraffin or petrolatum waxes, with ester waxes, with high molecular weight polybutylenes, and with other organic materials. Small proportions between about .01 and about 1 percent of the various polymers of ethylene produced by the process of the present invention can be dissolved or dispersed in hydrocarbon lubricating oils to increase V.I. and to decrease oil consumption when the compounded oils are employed in motors; larger amounts of polyethylenes may be compounded with oils of various kinds and for various purposes.

The products can be employed in small proportions to substantially increase the viscosity of fluent liquid hydrocarbon oils and as gelling agents for such oils.

The polymers produced by the present process can be subjected to chemical modifying treatments, such as halogenation, halogenation followed by dehalogenation, sulfohalogenation by treatment with sulfuryl chloride or a mixture of sulfur dioxide and chlorine, sulfonation, and other reactions to which hydrocarbons may be subjected.

I have found that lithium is distinguished from the other alkali metals in that:

(1) It is a catalyst for polymerizing ethylene to form normally solid polymers even when employed without a supporting material;

(2) It can be supported upon a wide variety of supporting materials other than absorbent alumina-containing materials to produce catalysts suitable for polymerizing ethylene to form normally solid polymers.

The use of supported or unsupported lithium catalysts for the polymerization of ethylene to form normally solid polymers is described and claimed in my copending application for United States Letters Patent, Serial No. 459,514, filed of even date herewith.

Having thus described my invention, what I claim is:

1. A process for producing a solid polymeric material, which process comprises contacting ethylene with a catalyst consisting essentially of an alkali metal having an atomic number of at least 11 and an adsorbent alumina-containing material, not in itself an ethylene polymerization catalyst, selected from the class consisting of a gamma-alumina, argillaceous materials, synthetic silica-alumina composites and fluorided alumina, effecting said contacting at a temperature between about 50° C. and about 200° C. and at a pressure of at least about 200 p.s.i. for a period of time sufficient to effect a substantial conversion of ethylene to form a solid polymer, and recovering a solid polymer thus produced.

2. The process of claim 1 wherein recovery of said solid polymer comprises extraction of said adsorbent alumina-containing material with a substantially inert solvent for said solid polymer and recovery of said polymer dissolved in said solvent.

3. The process of claim 1 wherein said alkali metal and said adsorbent are combined as a colloidal dispersion of said alkali metal on said adsorbent.

4. A process for producing a solid polymeric material, which process comprises contacting ethylene with a catalyst consisting essentially of an alkali metal having an atomic number of at least 11 and an adsorbent alumina-containing material, not in itself an ethylene polymerization catalyst, selected from the class consisting of a gamma-alumina, argillaceous materials, synthetic silica-alumina composites and fluorided alumina, effecting said contacting in the presence of a liquid hydrocarbon reaction medium at a polymerization temperature selected within the range of about 50° C. to about 200° C. and at a pressure of at least about 200 p.s.i. for a period of time sufficient to effect a substantial conversion of ethylene to a solid polymer, said reaction medium being substantially inert under the selected polymerization conditions, and recovering a solid polymer thus produced.

5. The process of claim 4 wherein said medium is a liquid saturated hydrocarbon.

6. The process of claim 4 wherein said alkali metal is sodium.

7. The process of claim 4 wherein said alkali metal is potassium.

8. A process for producing a solid polymeric material from ethylene, which process comprises contacting ethylene at a temperature between about 50° C. and about 200° C. under a pressure of at least about 200 p.s.i with a catalyst consisting essentially of a colloidal dispersion of an alkali metal having an atomic number of at least 11 upon an adsorbent alumina-containing material, not in itself an ethylene polymerization catalyst, selected from the class consisting of a gamma-alumina, argillaceous materials, synthetic silica-alumina composites and fluorided alumina, said alkali metal having been deposited upon said adsorbent at a temperature between about 150° C. and about 450° C., continuing said contacting for a period of time sufficient to effect substantial conversion of ethylene to a solid polymer, and recovering a solid polymer thus produced.

9. The process of claim 8 wherein recovery of said solid polymer comprises extraction of said adsorbent alumina-containing material with a substantially inert solvent for said solid polymer and recovering said polymer dissolved in said solvent.

10. The process of claim 8 wherein said alkali metal is potassium and said adsorbent is a gamma-alumina.

11. The process of claim 8 wherein said alkali metal is sodium and said adsorbent is a silica-alumina composite.

12. The process of claim 8 wherein said contacting is effected in the presence of a substantially inert liquid hydrocarbon reaction medium.

13. A process for producing a high density solid polymer from ethylene, which process comprises contacting ethylene in the presence of a substantially inert liquid hydrocarbon reaction medium at a temperature between about 50° C. and about 200° C. under a pressure of at least about 200° p.s.i. with a catalyst consisting essentially of a colloidal dispersion of sodium on a gamma-alumina, said sodium having been deposited upon said gamma-alumina at a temperature between about 100° C. and about 450° C., continuing said contacting for a period of time sufficient to effect substantial conversion of ethylene to a solid polymer having a relatively high density between about 0.97 and about 0.98 at 24° C., and recovering said solid polymer.

14. The process of claim 13 wherein said contacting is effected at a temperature within the range of about 125° C. to about 175° C. and the ethylene pressure is at least about 500 p.s.i.

References Cited in the file of this patent

UNITED STATES PATENTS

| | | |
|---|---|---|
| 2,212,155 | Ellis | Aug. 20, 1940 |
| 2,355,925 | Reid | Aug. 15, 1944 |
| 2,466,694 | Freed | Apr. 12, 1949 |
| 2,467,245 | Whitman | Apr. 12, 1949 |
| 2,691,647 | Field | Oct. 12, 1954 |
| 2,699,457 | Ziegler | Jan. 11, 1955 |
| 2,771,463 | Field et al. | Nov. 20, 1956 |

OTHER REFERENCES

Nonmetallic Minerals by Ladoo et al., 2nd ed., 1951, McGraw-Hill Pub. Co., page 185 pertinent.